Figure 1:
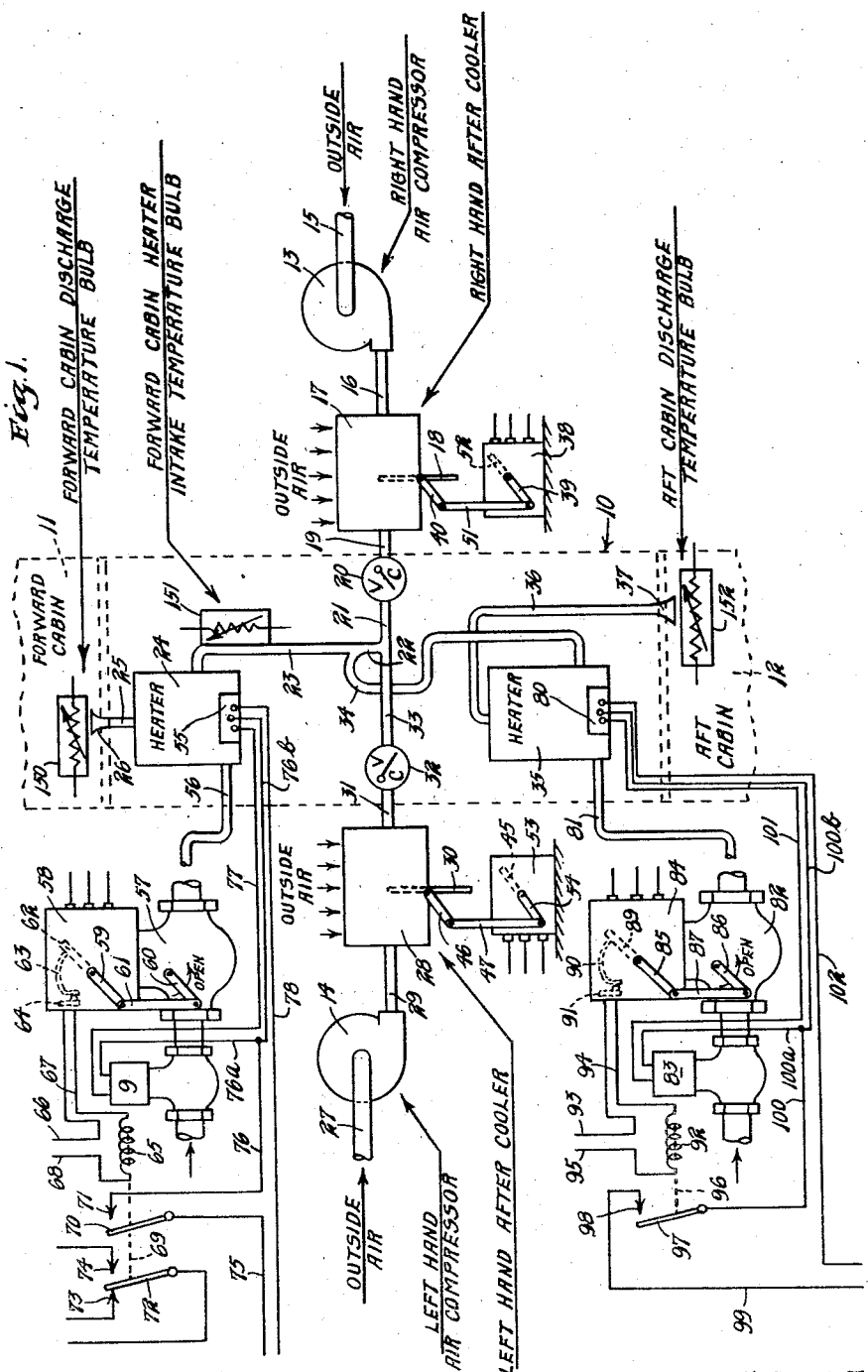

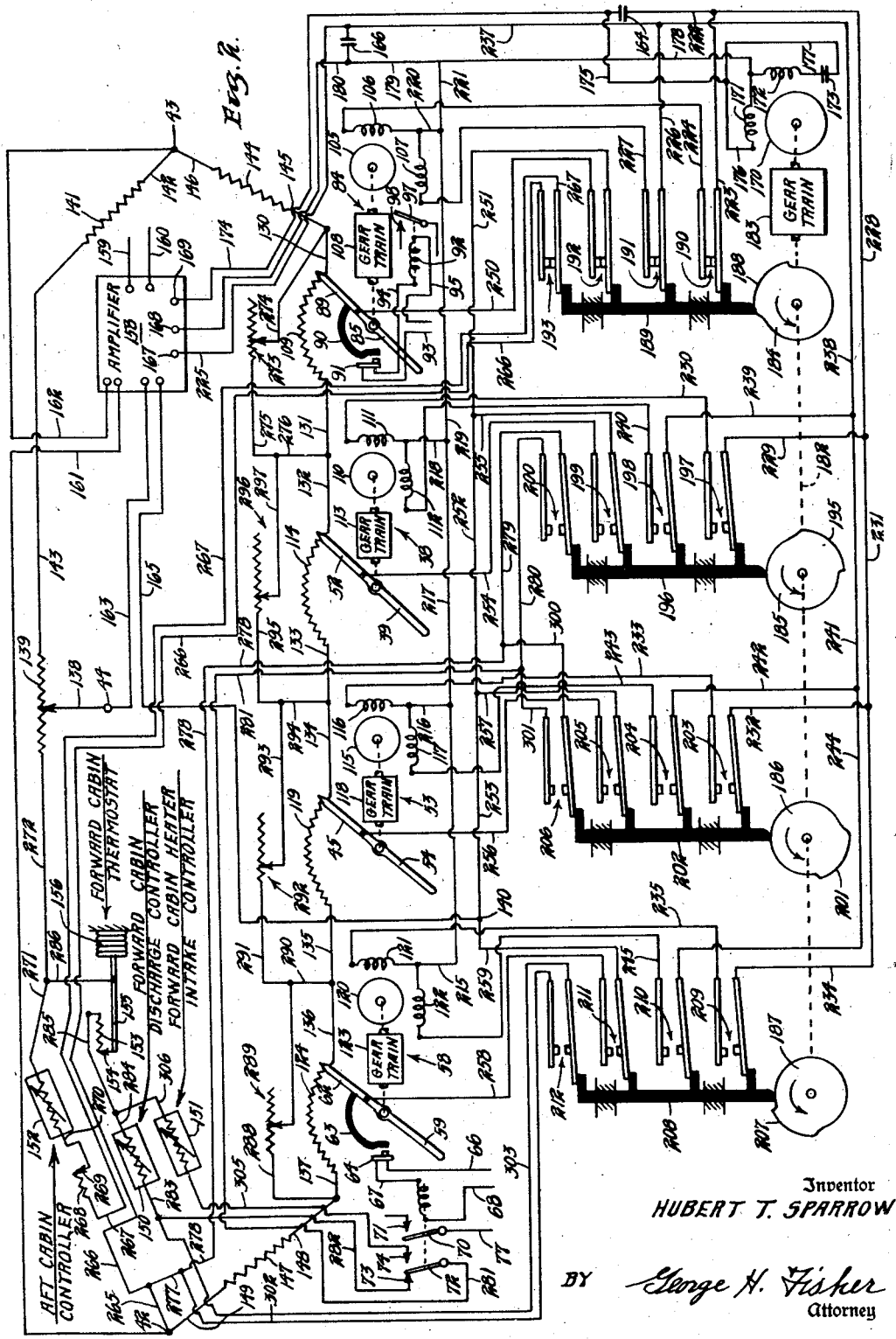

Patented Oct. 1, 1946

2,408,699

UNITED STATES PATENT OFFICE 2,408,699

AIRCRAFT TEMPERATURE CONTROL

Hubert T. Sparrow, Minneapolis, Minn., assignor to Minneapolis-Honeywell Regulator Company, Minneapolis, Minn., a corporation of Delaware Application November 30, 1942, Serial No. 467,385

12 Claims. (Cl. 172—239)

The present invention is particularly directed to the control of temperature in aircraft but it is to be understood that certain features of the system of control have a broad general utility wherever it is desired to variably position two or more devices in sequence from a single controlling device wherein each of the devices to be positioned is provided with its own separate independent power means.

Present day aircraft are being designed to fly at higher and higher altitudes where the air is quite rarified. In order to overcome the various difficulties arising from reduction in pressure at these higher altitudes, the cabins of many aircraft are now being pressurized. In other words, the cabins are sealed and a higher pressure is maintained therein than exists in the atmosphere at these high altitudes. This pressurizing is often accomplished by providing pumps or fans, commonly known as compressors, which compress the air from the outside atmosphere and deliver it to the aircraft cabin so as to maintain a higher pressure therein. Such compressors are often driven directly from the aircraft engine and their effect may be controlled, for example, by the use of a valve or damper which controls the supply of outside air to the compressor or discharged by the compressor. Such valves or dampers may be controlled in any desired manner and at the present time are often controlled manually. Furthermore, the reduction in pressure when flying at altitudes up to eight thousand feet, for example, does not cause any particular difficulty with the result that the compressors, although they may operate constantly whenever the aircraft engines are running, are not utilized to do any effective work until an altitude of approximately eight thousand feet is reached. In other words, instead of trying to maintain a pressure within the cabin equal to the standard pressure at sea level, the pressure within the cabin may be maintained equal to the standard pressure at eight thousand feet. The compression of the air by the compressors causes such air to be heated and the present invention contemplates utilizing as much or as little of the heat of the air heated by compression as may be necessary for maintaining desired temperatures within the aircraft cabin. To this end, one or more after coolers may be utilized for cooling the hot compressed air by the cooler outside air to any extent desired.

It is an object of the present invention to maintain desired temperatures within an aircraft cabin by utilizing the hot compressed air used for pressurizing the cabin and controlling the temperature of such hot compressed air so as to obtain the desired temperature within the aircraft cabin.

At the lower altitudes where very little if any compressing of the air takes place, since this may not be necessary in order to maintain the desired pressure within the cabin, there is often insufficient heat developed by the compressors to maintain the aircraft cabin at the desired temperature.

It is therefore an object of the present invention additionally to utilize auxiliary heaters to maintain desired temperature conditions within the aircraft cabin but to use such auxiliary heaters only when the compressors for pressurizing the cabin do not deliver sufficient air at a high enough temperature to maintain the desired temperature conditions within the aircraft cabin.

It will be obvious that the output of an auxiliary heater, such as a gasoline fired heater, can be predetermined by the design and size of the heater. At the same time, the amount of heat furnished by the compressors is of an extremely variable character. It depends, among other things, upon the temperature of the outside air being compressed as well as by the amount of compression taking place. In other words, the maximum output of the compressors in the form of heated air, as distinguished from the quantity thereof, may well vary for any given altitude due to variations in the temperature of the outdoor air, even though a constant pressure is being maintained within the cabin.

A further object of the invention, therefore, is to control the temperature of the air being delivered by the compressors to an auxiliary heater at a predetermined value or within a predetermined range of temperatures during such times as it is necessary to utilize the heating effect of the auxiliary heater.

In addition, many types of auxiliary heaters, while being capable of having their output or capacity modulated or varied over a rather wide range, can only have their capacity reduced to a certain percentage and then must be turned off entirely. For example, one well known type of gasoline heater may have its output modulated down to 15 per cent of its full capacity without any difficulty by reducing the supply of fuel thereto but may not safely be modulated below fifteen per cent. This means that when such a heater is initially turned on, it must start up at a minimum of fifteen per cent of its full capacity. However, at such time, the demands may be such as to only exceed the capacity of the compressors by say five per cent of the auxiliary heater capacity. Some heat is clearly needed over and above that furnished by the compressors but the fifteen per cent minimum capacity of the auxiliary heater is too much heat.

It is therefore a further object of the present invention to reduce the heat output of the compressors when the auxiliary heater is first turned on, in order to compensate for the large increase in heat which would otherwise occur upon the initial turning on of the auxiliary heater.

From the foregoing it will be seen that the present invention contemplates modulating a first device (the means for controlling the temperature changing effect of the compressor) and then thereafter modulating a second device (the auxiliary heater) in sequence. Theoretically, this of course could be accomplished in any number of manners but from a practical standpoint these devices must be power driven and are often at points remote from each other. The present invention therefore contemplates providing each of the devices with its own separate power driving means and arranging the control system in such manner that the separate power driving means are controlled in a desired sequence so that the one device moves throughout a considerable range of movement while the second device remains stationary, the second device then moving throughout its range of movement upon further demands.

It is therefore a further object of the present invention to automatically control a pair of power operated devices from a single controller so that they are modulated in sequence, that is, they are not modulated together over their entire range of movement.

Additionally, it is an object of the present invention to modulate a pair of devices in sequence wherein the second device must initially be moved throughout a substantial part of its movement and substantially simultaneously retracting part of the movement of the first device in order to compensate for this substantial initial movement of the second device.

The power means for the devices preferably takes the form which remains stationary normally and requires the application of power to move the devices in either direction.

Another object of the invention then is the modulation of two such power devices in sequence.

Another object of the invention is the provision of a follow-up type of system in which two or more devices each are capable of producing a predetermined portion of the complete follow-up action, which portions are less than the complete follow-up action, so that upon wide changes in demand, each device is actuated throughout a range of movement corresponding to its portion of the complete follow-up action. Thus, the two devices move independently of each other.

The power devices are preferably electrical and are preferably controlled from a single balanced bridge circuit. Each device is capable of producing a certain rebalancing action which is only a portion of the complete rebalancing action, the rebalancing actions of the two or more devices taken together being sufficient to rebalance the bridge regardless of the amount of unbalance. However, neither device above is capable of providing the entire rebalancing action.

It is therefore a further object of the present invention to control two or more devices by a single bridge circuit which is capable of being unbalanced to a relatively large extent, each device being capable of producing a rebalancing action equal only to a different portion of the total possible unbalancing of the bridge.

Other objects of the invention reside in specific details of the electrical bridge circuit, various features of adjustment, and other features of the system as a whole and will become apparent upon a reading of the following detailed description in connection with the accompanying drawings, in which:

Fig. 1 is a diagrammatic showing of a portion of an aircraft fuselage showing the general arrangement and interconnection of the temperature control system, and Fig. 2 is a detailed circuit showing the manner in which the apparatus of Fig. 1 is controlled.

Referring first to Fig. 1, the fuselage of an aircraft is partially indicated in dotted lines at 10. The fuselage is provided with a forward sealed cabin 11 and a rear or aft cabin 12 which is likewise sealed. Air is supplied to the forward cabin 11 and aft cabin 12 under pressure, for maintaining a desired pressure in such cabins, by a pair of compressors 13 and 14. The compressor 13 is located on the right-hand side of the aircraft and is supplied with air from the outside atmosphere, as by an intake 15. This air is delivered by a duct 16 to a heat exchanger or after cooler 17 in which the air, which is heated by compression, may be cooled by passing outside air thereover through the after cooler as indicated by the arrows at the top of the after cooler 17. The flow of outside air through the right-hand after cooler 17 is controlled by shutters or damper means, herein conveniently illustrated as a single damper 18, although of course in actual practice such damper means might well be broken up into a number of smaller components. The air then passes by way of a duct 19 through a swing check valve 20 and then through ducts 21, 22 and 23 to the intake or inlet side of an auxiliary heater 24. The air then passes by a duct 25 to the forward cabin 11 into which it is discharged through an outlet 26.

The left-hand compressor 14 similarly takes in outside air through an intake 27 and the compressed air passes to a left-hand after cooler 28 by way of a duct 29. The left hand after cooler 28 is also cooled by the flow of outside air therethrough as indicated by the arrows and such flow of outside air is herein shown as controlled by the single damper or shutter 30. The compressed air then goes by way of a duct 31, through a check valve 32, and a duct 33 which joins the ducts 21 and 22.

Some of this air is also supplied to the aft cabin 12. For this purpose, a duct 34 connects between ducts 22 and 23 and leads to the inlet or intake of an auxiliary heater 35. The air then passes through the heater 35 to the aft cabin 12 by way of a duct 36 and outlet 37.

The damper 18 of the right-hand after cooler 17 is varyingly or modulatingly positioned, in a manner which will be hereinafter described in detail, by an electrical modulating motor 38. This motor is provided with a crank arm 39 which is connected to a second crank arm 40 by a link 51. The crank arm 40 is in turn connected to the damper 18. In addition, the modulating motor 38 is internally provided with a balancing contact finger 52, the purpose of which will be explained in detail hereinafter. In a similar manner, the damper 30 of the left-hand after cooler 28 is positioned by an electrical modulating motor 53 having a crank arm 54 and an internal balancing contact finger 45. The crank arm 54 is connected to a crank arm 46, that is connected to the damper 30, by a link 47.

The auxiliary heater 24 may be of any desired type and may well take the form of the well known Stewart-Warner gasoline heater. Fuel is fed to the heater 24 by a fuel supply pipe 56 which has located therein a modulating fuel supply valve 57 and an on and off solenoid type fuel supply valve 9. The modulating valve 57 includes an electrical modulating motor mechanism 58 that is provided with a crank arm 59. The crank arm 59 is connected to an operating crank 60 of the valve 57 by a link 61. In addition, the motor mechanism 58 is provided with an internal balancing contact finger 62 to which is connected a switch operating member 63, of insulating material, that operates a snap switch 64. The snap switch 64 may well take the form disclosed in Albert E. Baak Patent 2,318,734. Under certain conditions of operation, as will be explained hereinafter, the switch 64 is moved to closed position by the switch operating member 63. Upon closure of the switch 64, a relay coil 65 is energized by a circuit as follows: line wire 66, switch 64, wire 67, relay coil 65, and line wire 68. When the relay coil 65 is energized, it attracts an armature 69 that operates a switch arm 70 into engagement with a contact 71 and further moves a switch arm 72 away from a contact 73 and into engagement with a contact 74. Engagement of switch arm 70 with contact 71 energizes the solenoid valve 9 and supplies power to the terminal panel 55 of the heater 24 as follows: line wire 75, switch arm 70, contact 71 and wire 76 where the circuit branches, part going by way of wire 76a, solenoid valve 9 and wire 77 to the panel 55 whereas wire 76b goes directly to the panel 55.

The wire 76b supplies power to the ignition means and its control whereas the wire 77 goes to the limit controls which form a part of such heaters. The wire 78 is a common return wire.

The heater 35 for the aft cabin may well take the same form as the heater 24 for the forward cabin. Fuel is supplied to the heater 35 by a fuel supply pipe 81. Located in this fuel supply pipe 81 is a modulating valve 82 and a solenoid on and off valve 83. The modulating valve 82 is operated by a motor mechanism 84 that includes a crank arm 85 which is connected to the valve operating arm 86 by a link 87. The modulating motor 84 further includes an internal balancing contact finger 89 and associated switch operating member 90 that in turn operates a snap switch 91, similar to the snap switch 64 of the motor mechanism 58. When snap switch 91 is closed, it energizes a relay coil 92 by a circuit as follows: line wire 93, snap switch 91, wire 94 and relay coil 92 to the other line wire 95. When the relay coil 92 is energized, it attracts an armature 96 that in turn moves a switch arm 97 into engagement with a contact 98. This completes circuits for solenoid valve 83 and to the panel 80 as follows: line wire 99, contact 98, switch arm 97 and wire 100, where the circuits branch, one part going by way of wire 100a, solenoid valve 83 and wire 101 to the panel 80, whereas the other part goes directly to the panel 80 by wire 100b. Wire 102 is the common return wire.

In connection with the apparatus as thus far described, the right- and left-hand air compressors 13 and 14 may be driven in any of the usual manners, as by being directly geared to the aircraft engine or engines. Furthermore, the output of these compressors may likewise be controlled as desired so as to maintain predetermined pressure conditions within the forward and aft cabins regardless of the altitude at which the aircraft is flying. This may be done, for example, by controlling the amount of air flowing into or delivered by the compressors. Such a system of pressurizing cabins and of manually controlling the capacities of the compressors so as to maintain desired pressure conditions within the cabin or cabins of an aircraft has been used heretofore. Further, by properly sizing the ducts connecting the compressors with the forward and aft cabins in accordance with the size and heat loss of such cabins, the air can be distributed to these cabins in a manner to maintain both of them at desired pressures and so as to distribute the heat of the compressed air between them in the ratios desired.

Whenever the temperature of the compressed air is greater than that needed to maintain desired temperature conditions, the compressed air may be cooled by variably positioning the dampers 18 and 30 of the right and left-hand after coolers 17 and 28. Further, in the event the heat of the compressed air is insufficient, the auxiliary heaters 24 and 35 may be brought into operation to supply the additional heat needed. The output of the heaters may be modulated by means of the modulating valves 57 and 82. However, in order to obtain any supply of fuel whatsoever, the associated series connected solenoid valves 9 and 83 must be opened. Since these particular heaters must either be off or be started at approximately 15% capacity, the switch operators 63 and 90 are so arranged that the associated snap switches 64 and 91 are not operated until the corresponding modulating valves 57 and 82 have opened to such an extent as to supply 15% of the total fuel supply. When the valves have been moved to such positions, the snap switches are operated whereupon the solenoid valves 58 and 83 open. This places the heaters in operation. In this manner, temperature conditions within the forward and aft cabins may be maintained as desired and the heat of the compressed air which is normally primarily utilized for pressurizing the cabins may first be used before any auxiliary heat from the heaters 24 and 35 is utilized. The control system by means of which the right and left-hand after coolers and the auxiliary heaters 24 and 35 is controlled will now be explained in detail.

Turning now to Fig. 2, the modulating mechanism 84 of the modulating valve 82, in addition to including the parts heretofore described, also includes a split-phase motor comprising the rotor 105 and the usual associated windings 106, 107. The rotor 105 positions the crank arm 85 and the balancing contact finger 89 through a suitable gear train 108. The balancing contact finger 89 cooperates with a balancing resistance 109. Similarly, the motor mechanism 38 for the right-hand after cooler includes a split phase motor having a rotor 110 and the usual windings 111 and 112. The rotor 110 positions the crank arm 39 and the balancing contact finger 52 through a suitable gear train 113. The contact finger 52 cooperates with a balancing resistance 114. In like manner, the modulating motor 53 for the left-hand after cooler includes a split phase motor having a rotor 115 and the usual windings 116 and 117. The rotor 115 drives the crank arm 54 and the balancing contact finger 45 through a suitable gear train 118. The balancing contact finger 45 cooperates with a balancing resistance 119. Likewise, the motor mechanism 58 for the modulating valve 57 includes a split phase motor having a rotor 120 and the usual windings 121 and 122. The rotor 120 drives the crank arm 59 and the balancing contact finger 62, as well as the switch operating member 63, through a gear reduction train 123. The balancing contact finger 62 cooperates with a balancing resistance 124.

The balancing resistances 109, 114, 119 and 124 are all connected in series and constitute a portion of a single resistance bridge circuit. This series circuit is as follows: wire 130, balancing resistance 109, wire 131, wire 132, balancing resistance 114, wire 133, wire 134, balancing resistance 119, wire 135, wire 136, balancing resistance 124, and wire 137. The resistance bridge includes the usual input or power supply terminals, shown at 42 and 43, by means of which alternating current is supplied to the bridge. One of the bridge output terminals is indicated at 44 and comprises the pivoted end of a contact arm 138 which engages a variable resistance 139. This constitutes a calibrating resistance for originally balancing the system at a desired point. The other bridge output terminal selectively comprises some one of the balancing contact fingers 89, 52, 45 or 62, as the case may be, since these contact fingers are selectively connected into the circuit in a manner which will be described hereinafter. Whenever any one of these contact fingers is connected into the circuit, it is connected to the terminal indicated at 140, and therefore in the explanation to follow the terminal 140 will be considered as the other bridge output terminal. The upper right-hand leg of the bridge is disposed between the bridge input terminal 43 and the bridge output terminal 44 and comprises a fixed resistance 141 which is connected to the input terminal 43 by a wire 142 and further includes that portion of the calibrating resistance 139 located to the right of the contact finger 138, to which the fixed resistance 141 is connected by a wire 143. The lower right-hand leg of the bridge circuit includes varying portions of the balancing resistances 109, 114, 119 and 124, depending upon which of the associated balancing contact fingers is connected into the circuit at any particular time and also depending upon the position of such contact finger. This lower right-hand leg further includes a fixed resistance 144, one end of such resistance being connected to wire 130 by a wire 145 and the other end thereof being connected to the bridge input terminal 43 by a wire 146. In a similar manner, the lower left-hand leg of the bridge circuit includes some portion of the series connected balancing resistances and a fixed resistance 147, one end of which is connected to wire 137 by a wire 148 and the other end of which is connected to the bridge input terminal 42 by a wire 149. The upper left-hand leg of the resistance bridge circuit includes a number of thermally responsive variable resistances which are selectively connected into the circuit under varying conditions. These connections will be described in detail hereinafter. These variable resistances include temperature sensitive resistances 150, 151 and 152. All of these temperature sensitive resistances are of the usual type in which the resistance increases upon temperature increase. The temperature sensitive resistance 150 responds to the temperature of the air being discharged into the forward cabin and is therefore shown, in Fig. 1, as being located directly in front of the outlet 26. The temperature sensitive resistance 151 responds to the temperature of the air being delivered to the heater 24 for the forward cabin and is therefore shown, in Fig. 1, as contacting the duct 23 leading to the auxiliary heater 24. The temperature sensitive resistance 152 responds to the temperature of the air discharged into the aft cabin and is therefore shown in Fig. 1 as being located directly in front of the outlet 37. In addition, this leg of the bridge includes a temperature operated variable resistance comprising a resistance 153 and a cooperating contact 154 which is positioned by an arm 155 that is in turn caused to move back and forth by a temperature sensitive element 156, herein shown in the form of the well known bellows. This thermostatically or temperature operated variable resistance responds to the temperature within the forward cabin as distinguished from the temperature of the air being discharged thereinto. If desired, the resistance 153 may be varied manually instead of thermostatically.

Associated with the bridge circuit and with the windings of the various motors heretofore described, is an electronic amplifier and transformer unit 158. The amplifier may be of any conventional type in which the output voltage has a definite phase relation to the signal voltage. Typical amplifiers of this type are shown in the Anschutz-Kaempfe Patent 1,586,233 and the Chambers Patent 2,154,375. The amplifier and transformer unit 158 is supplied with alternating current which supply is herein indicated by the wires 159 and 160. The transformer portion of the unit 158 further applies power to the bridge input terminals 42 and 43 in such manner as to apply an alternating potential thereto which is fixed in phase with respect to the main supplies 159 and 160. These connections to the bridge input terminals are by wires 161 and 162. The output terminals 44 and 140 of the bridge circuit are connected to amplifier input terminals by wires 163 and 165. In addition, the amplifier and transformer unit 158 is provided with three terminals for connection to the motor or motors. These are indicated at 167, 168 and 169. There is a constant source of potential across the common or return terminal 168 and the terminal 169, which potential is fixed in phase with respect to the power supply 159 and 160. The terminal 167 only has potential applied thereto when the bridge is out of balance, and this potential varies in phase depending upon the manner in which the bridge is unbalanced, as will be more fully described hereinafter.

It has been stated above that the various balancing contact fingers of the four motor mechanisms are selectively connected to the bridge. This is accomplished by a program switching mechanism, located at the lower part of Fig. 2, which will now be described. This switching mechanism includes a split phase motor having a rotor 170 and the usual windings 171 and 172. The winding 171 is directly connected to the motor terminal 169 of the amplifier 158, and the winding 172 is connected thereto through a condenser 173. These circuits are as follows: terminal 169, wire 174 and wire 175 at which point the circuit splits, one portion going to one end of winding 171 by way of wire 176 and the other portion going to one end of winding 172 by way of a wire 177 and condenser 173. The opposite ends of the windings 171 and 172 are both directly connected to the common terminal 168 of the amplifier 158 by wires 178, 179 and 180. As a result, the windings 171 and 172 are constantly energized but one of these windings is 90 degrees out of phase with the other by reason of the insertion of condenser 173 so that the rotor 170 is constantly rotated, as is well known in the split phase motor art. Rotor 170 drives a cam shaft 182 through a suitable gear train 183. The motor speed and reduction gear train 183 may be so correlated, for example, as to cause the cam shaft 182 to make fifteen revolutions per minute or one revolution every four seconds. Cam shaft 182 drives four cams 184, 185, 186 and 187. The cam 184 is provided with a raised portion extending substantially over one quarter of its circumference as shown at 188. The raised portion 188 cooperates with a cam follower 189 that operates four switches 190, 191, 192 and 193 to closed-circuit position upon raising of the cam follower 189 by the raised portion 188. The switches 190, 191, 192 and 193 therefore are closed during one quarter of each revolution of the cam shaft 182. In other words, these switches are closed one second out of every four seconds. The cam 185 is provided with a similar raised portion 195 that co-operates with a cam follower 196 that operates four switches 197, 198, 199 and 200. The raised portion 195 of the cam 185 is in such position that it engages its cam follower 196 at the moment that the cam follower 189 leaves the raised portion 188 of cam 184. In a like manner, the cam 186 is provided with a raised portion 201 that cooperates with a cam follower 202 which operates four switches 203, 204, 205 and 206. The raised portion 201 is so placed that it raises its cam follower 202 at the time that the cam follower 196 rides off of the raised portion 195 of cam 185. Similarly, the cam 187 is provided with a raised portion 207 that cooperates with a cam follower 208 which in turn operates four switches 209, 210, 211 and 212. The raised portion 207 is so positioned that it raises its cam follower 208 at the time that the follower 202 rides off of the raised portion 201 of cam 186. As a result, the four sets of four switches are repeatedly closed in sequence for a period of one second and this sequence is repeated over and over again under the constant energization of the motor comprised by rotor 170 and the windings 171 and 172.

Each and every one of the eight windings of the four modulating motors has one of its ends connected to the common terminal 168 of the amplifier 158 by means of wires 215, 216, 217, 218, 219, 220, 221, 179, and wire 180 to such terminal 168.

Winding 106 of motor mechanism 84 is intermittently connected to terminal 169 of the amplifier 158 through a condenser 164 and switch 190 by a circuit as follows: terminal 169, wire 174, condenser 164, wire 222, wire 223, switch 190, and wire 224 to the upper end of winding 106. The winding 107 of the same motor mechanism 84 is connected to terminal 167 of amplifier 158 by wire 225, wire 237, wire 226, switch 191, and wire 227 to one end of winding 107.

In like manner, windings 111, 116 and 121 are each selectively connected to the terminal 169 through the condenser 164 and through their respective switches 197, 203 and 209 by a wire 228 which joins wire 222 and additionally by wires 229 to 235, inclusive. Also, the windings 112, 117 and 122 are each selectively connected to the terminal 167 through their respective switches 198, 204 and 210 by a wire 238 which connects to wire 237 and additionally by wires 239 to 245, inclusive.

The balancing contact finger 89 of motor mechanism 84 is connected to the bridge output terminal 140 by wire 250, switch 192, wire 251, wire 252, and wire 253. Similarly, the balancing contact finger 52 of motor mechanism 38 is connected to bridge output terminal 140 by wire 254, switch 199, wire 255, wire 252, and wire 253. In like manner, the balancing contact finger 45 of motor mechanism 53 is connected to bridge output terminal 140 by wire 256, switch 205, wire 257 and wire 253. Further, the balancing contact finger 62 of motor mechanism 53 is connected to bridge output terminal 140 by wire 258, switch 211, and wire 259.

The connections of the various variable resistances and other parts included in the upper left-hand leg of the bridge circuit as well as the connections of the remaining switch of each of the four sets of switches, namely the switches 193, 200, 206 and 212 will be brought out in the detailed description of the operation of the system.

*Operation*

For the purpose of more clearly explaining what happens in the system from an electrical standpoint, let it be assumed for the time being that there is always heat available from the compressors 13 and 14 irrespective of the altitude at which the aircraft is flying. Further, with the parts in the position shown in Fig. 2, a condition is represented wherein the aircraft is at a reasonably low altitude in temperate weather so that the temperature within the aircraft is at say 80 degrees without there being any heat supplied thereto. In other words, the outdoor temperature conditions are such that no heat is needed in the aircraft. It will be noted, that the group of switches controlled by cam 184 has just been closed since the raised portion 188 of such cam has just begun to move underneath the cam follower 189. Under these conditions, the windings 106 and 107 are connected to the amplifier 158 by the circuits previously described and additionally, the balancing contact finger 89 is connected to the bridge output terminal 140 by the wiring heretofore described. Furthermore, closure of switch 193 has completed a circuit comprising the left-hand leg of the bridge circuit, as follows: from the bridge input terminal 42, to wire 265, wire 266, switch 193, wire 267, a resistance 268, a cooperating contact 269, wire 270, the aft cabin discharge controller 152, wire 271, wire 272, resistance 139, and contact 138, to the output terminal 44 of the bridge circuit. The manual contact 269 is engaging resistance 268 at such a point that the full amount of such resistance is included in the circuit just traced. The resistance bridge circuit as a whole may be based, for example, on providing a 500 ohm bridge. Also, the aft cabin discharge controller 152 should be such that it is capable of having a control range of from, for example, 80° F. to 180° F. with an operating differential of say 5° F. Under these conditions, and remembering that the temperature of the outside atmosphere and therefore of the aft cabin, as well as any air flowing over the discharge controller 152, as will presently be explained, is at 80°, then the resistance of controller 152 at a temperature of 80° plus the manual resistance of resistance 268 should equal substantially 500 ohms plus the effective resistance of all four balancing resistances. Under such conditions, and assuming that the input terminal 42 of the bridge has the higher potential and the input terminal 43 has the lower potential, then in order for the bridge to be in balance, the output terminal 44 and the output terminal 140 should be at equal potentials. In order to have them at equal potentials, the balancing contact finger 89 is at the extreme right-hand end of balancing resistance 109, so that the lower left-hand leg of the bridge comprises the fixed resistance 147 as well as all of the balancing resistances in series, and the lower right-hand leg of the bridge includes only the fixed resistance 144. In order to obtain a balance under these conditions, and wherein each of the four balancing resistances has a resistance of substantially 400 ohms, there is provided manually operable shunt resistances for each of the balancing resistances so that their effective resistances may be adjusted to a much smaller value. This shunt resistance for balancing resistance 109 is indicated at 273 and shunts the balancing resistance 109 by a circuit as follows: starting at the right-hand end of resistance 109, then by way of wire 130, a wire 274, shunt resistance 273, a wire 275, a wire 276, and wire 131 to the left-hand end of balancing resistance 109. The shunt resistances for the remaining three balancing resistances and the wiring therefor is as follows: starting with the left-hand end of balancing resistance 124, wire 137, wire 288, shunt resistance 289, wire 290, wire 291, shunt 292, wire 293, wire 294, wire 295, shunt 296, and wire 297 to wire 276. Each of these shunt resistances is manually adjustable and may be adjusted to, say, five or six ohms. These resistances also determine the over-all temperature differential or temperature change required at the controllers for the system to operate throughout its complete cycle. Incidentally, the three fixed resistances of the bridge 141, 144, and 147 may, for example, each be of 500 ohms and the calibrating resistance 139 may, for example, be 15 ohms.

Since the bridge is in balance with the parts in the position shown, no power will be supplied to terminal 167 as is fully brought out in the previous description. Only winding 106 of the motor will then be energized wherefore rotor 105 will remain stationary and the parts will remain in the positions shown.

After the passage of one second, the cam 184 will open its group of switches and the cam 185 will close its group of switches. The motor windings 106 and 107 and the balancing contact finger 89 of the modulating mechanism 84 are therefore disconnected and likewise the circuit through the aft cabin discharge controller 152 is broken. However, the motor windings 111 and 112 of the motor mechanism 38 are now connected to the amplifier 158 and the balancing contact finger 52 is connected to the bridge output terminal 140 by the circuits previously traced. In addition, the switch 200 operated by cam 185 sets up a new circuit comprising the upper left-hand or controlling leg of the bridge. This new circuit is as follows: bridge input terminal 42, wire 265, wire 277, wire 278, wire 279, switch 200, wire 280, wire 281, switch arm 72, contact 73, wire 282, wire 283, forward cabin discharge controller 150, wire 284, wire 285, resistance 153 of the cabin temperature controller, contact 154 thereof, arm 155, wire 286, wire 272, the left-hand portion of resistance 139 and contact finger 138 to the output terminal 44. Inasmuch as the cabin temperature is 80° or thereabouts, the thermostatically operated contact 154 is at one extreme end of resistance 153 so that all of such resistance is in the circuit. This it will be noted is in series with the temperature sensitive resistance 150 which responds to the temperature of the air being discharged into the forward cabin. The combined resistance of these two resistances under such temperature conditions should be substantially 500 ohms plus the effective resistance of the three rebalancing resistances 124, 119 and 114. Since the bridge is in balance under these conditions, only winding 111 of the modulating motor mechanism 38 is energized wherefore rotor 110 remains in a stationary position. As a result, the damper 18 of the right-hand after cooler remains wide open so that a full flow of outside air flows through the right-hand after cooler. The air being delivered to the cabin is therefore at outside temperature, or 80°. As a result, nothing happens during the one second that the cam 185 holds its switches closed.

After this one second period has expired, the cam 185 opens its respective switches, thereby disconnecting contact finger 52 from bridge output terminal 140 and disconnecting motor windings 111 and 112. In addition, the circuit through the forward cabin discharge controller 150 is broken. At the same time, cam 201 closes its set of four switches. Closure of the lower two switches connects the windings 116 and 117 of the motorized mechanism 53 to the amplifier 158. Closure of the switch 205 connects contact finger 45 to the bridge output terminal 140. Closure of switch 206 establishes a further circuit for the controlling leg of the bridge through the forward cabin discharge controller 150 and the cabin temperature operated resistance as follows: from bridge input terminal 42, wire 265, wire 277, wire 278, wire 299, switch 206, wire 301, wire 281, switch arm 72, contact 73, wire 282, wire 283, resistance controller 150, wire 284, wire 285, resistance 153, contact 154, arm 155, wire 286, wire 272, the left-hand portion of calibrating resistance 139, contact 138, and bridge output terminal 44. In other words, under this particular set of conditions, the controlling leg of the bridge circuit is exactly the same as that just described in connection with motor mechanism 38. However, whereas the lower left-hand leg of the bridge formerly included the three balancing resistances 114, 119 and 124, it now only includes two of them, namely balancing resistances 119 and 124. The lower right-hand leg of the bridge on the other hand now includes both balancing resistances 109 and 114 where before it only included the one balancing resistance 109. Since the bridge was formerly in balance, it is obvious that it is now out of balance. In other words, since there is less resistance to the left of bridge output terminal 140 than formerly, the potential of the bridge output terminal 140 is now higher than that of bridge output terminal 44. As a result, the amplifier and transformer unit 158 not only energizes motor winding 116 ninety degrees out of phase with the power supply in view of condenser 164, but it also energizes motor winding 117 either in phase with the power supply or 180 degrees out of phase therewith depending upon the direction of unbalance of the bridge. When the bridge is unbalanced in one direction, that motor winding which is not constantly energized is energized with a current which is in phase with the power supply and when the bridge is unbalanced in the other direction, that motor winding is energized by current which is 180 degrees out of phase. Therefore, the one motor winding either leads or lags the other 90 degrees. For the purpose of this discussion, let us assume that with an unbalance of the type which we now have wherein the potential of bridge output terminal 140 is higher than that of bridge output terminal 44, the motor winding 117 is energized by a current which leads that of motor winding 116 by 90 degrees. The rotor 115 will therefore rotate in such a direction, or try to rotate in such a direction, that gear train 113 will try to drive contact finger 45 to the right. However, since the contact finger 45 is at the end of balancing resistance 119, in which position the shutter 30 of the left-hand after cooler is wide open, it is at its limit of travel and the motor will merely remain stationary since it will be stalled under such conditions. It will be obvious that in order to rebalance the bridge more resistance would have to be placed in the lower left-hand leg thereof and this is what the motor mechanism 53 tries to do but it cannot accomplish its objective because it is already at the end of its movement. As a result, the left-hand after cooler damper 30 remains in its wide open position and the air being delivered by the left-hand compressor is cooled to the greatest extent.

After the period of a second, the cam 201 permits its associated switches to open which disconnects contact finger 45 from bridge output terminal 140 and also disconnects the motor windings 116 and 117 from the amplifier 158. In addition, the last named circuit for the control leg of the bridge circuit is interrupted. At the same instant, the cam 207 closes its associated switches. Closure of switches 209 and 210 connects motor windings 121 and 122 to the amplifier 158. Closure of switch 211 connects the contact finger 62 to the bridge output terminal 140. These circuits have been previously traced. In addition, closure of switch 212 establishes a further controlling leg bridge circuit which includes the same resistance elements as heretofore described. This circuit is as follows: starting with bridge input terminal 42, wire 265, wire 277, wire 302, switch 212, wire 303, wire 283, forward cabin discharge controller 150, wire 284, wire 285, resistance 153, contact 154, arm 155, wire 286, wire 272, the left-hand end of calibrating resistance 139, contact 138, and bridge output terminal 44. Here again, we have the same circuit in the controlling leg of the bridge as in the two previous instances. However, the bridge output terminal 140 is now connected to the contact finger 62 so that the lower left-hand leg of the bridge has still less resistance since it now includes only the single balancing resistance 124. As a result, the potential of bridge output terminal 140 will be still higher with respect to bridge output terminal 44 than it was in the last instance wherefore the motor mechanism 56, in trying to rebalance the bridge, will try to move the contact finger 62 to the right. Here again, this is impossible since it is already at its limit of movement, wherefore the motor will remain stationary under a stalled condition, and the modulating valve 57 for the forward cabin heater 24 will remain in its full closed position.

So long as the temperature conditions remain the same the system will continuously go through its cycle sequentially connecting the various contact fingers into the bridge circuit but no change in the position of any of the parts will occur.

Let us now assume that the aircraft begins climbing and as a result the temperature outdoors becomes cooler. The temperature of the aft cabin discharge controller 152 will drop slightly and its resistance will therefore decrease. The potential of bridge output terminal 44 will now become closer to that of bridge input terminal 42 (in other words the potential of bridge output terminal 44 increases) and, when the program switching mechanism is in the position shown, the potential of bridge output terminal 140 (which under such conditions is connected to the contact finger 89) has been unchanged. The potential of bridge output terminal 44 is now higher than that of bridge output terminal 140. This is the reverse of the situation discussed above so that the amplifier 158 will now supply to the motor winding 107 a current which lags that of the winding 106. Rotor 105 now drives contact arm 89 to the left. This reduces the resistance in the lower left-hand leg of the bridge and thereby raises the potential of bridge output terminal 140. When this potential again equals that of bridge output terminal 44, the amplifier will no longer supply current to the motor winding 107 and the motor will cease rotating. The modulating valve 82 for the aft cabin heater 35 has thus been opened somewhat. Let us assume that this opening of the valve 82 for the aft cabin heater 35 is less than 15 per cent so that the snap switch 91 remains open. Under these conditions, although the bridge has been rebalanced, still no heat is furnished to the aft cabin by its auxiliary heater. The cam 185 now closes its switches so that the forward cabin discharge controller and the associated cabin thermostat now control the bridge and the motor mechanism 38 is connected into the circuit. This aforementioned drop in temperature does two things in connection with the forward cabin. The temperature of the forward cabin discharge controller 150 drops slightly so that its resistance decreases. Also, the forward cabin temperature itself decreases so that the thermostatic element 156 contracts and contact 154 moves to the right along resistance 153 thereby removing some of the resistance from the circuit. The controlling leg of the bridge therefore has had its resistance decreased in two different manners. As a result of this decrease in resistance, the potential of bridge output terminal 44 is higher than that of bridge output terminal 140 which is now connected to the contact finger 52 of motor mechanism 38. It follows then that motor winding 112 is energized with a lagging current in respect to that of winding 111 whereupon motor rotor 110 turns in such a direction that gear train 113 drives contact finger 52 towards the left along balancing resistance 114 and simultaneously partially closes damper 18 of the right-hand after cooler. Keeping in mind that for the purposes of the present discussion we are assuming that there is always a certain amount of heat available from the compressors regardless of altitude, this partial closing down of damper 18 reduces the flow of outside air through the right-hand after cooler so that the temperature of the air being delivered to both the forward cabin and the aft cabin is increased. This increase in temperature of such air will raise the temperature of the forward cabin discharge controller 150 and thereby increase its resistance. However, it does not necessarily raise to any substantial extent the temperature within the cabin itself. It may just be sufficient to offset the increased heat loss therefrom. The ultimate result is that the bridge is again rebalanced when contact finger 52 has moved to some predetermined position along balancing resistance 114 in a left-hand direction and more heat is being delivered to the cabins under this set of conditions. With the bridge rebalanced, and this will take place very very quickly in view of the electronic amplifier 158 which operates very rapidly, the winding 112 will be deenergized by the amplifier 158. Therefore, as a result of this small temperature drop, less cooling air is flowing through the right-hand after cooler so that more heat is being delivered to the cabin and the control point of the forward cabin discharge controller 150 has been raised since the amount of resistance in series therewith has been decreased by the action of the forward cabin thermostat.

Again, after the passage of one second, the cam 185 permits its associated switches to open and the cam 186 closes its associated switches. The potential of bridge output terminal 140 is now that of the contact finger 45 and the controlling leg of the bridge is that including the forward cabin discharge controller 150 and the forward cabin thermostat. Assuming that conditions have not changed further, it will be evident that the potential of bridge output terminal 140 is still higher than that of bridge output terminal 44 since contact finger 45 is now connected to the bridge output terminal 140 and the bridge was in balance just a moment ago when the finger 52 was connected to bridge output terminal 140 and such finger 52 had only moved a little ways to the left along balancing resistance 114. The motor winding 117 will again be energized with a current which leads motor winding 116 and the apparatus will attempt to move contact finger 45 to the right but will be unable to do so since the motor stalls under these conditions. Therefore, the damper 30 of the left-hand after cooler remains in wide open position.

Subsequently, the cam 187 operates its switches to connect contact finger 62 to the bridge output terminal 140. The unbalance of the bridge will be even greater than when contact finger 45 was connected to the bridge output terminal 140 and again, winding 122 will be energized with a current which leads that of winding 121 and an attempt will be made to further close the already closed modulating heater valve 57, but this will be unsuccessful and the motor will be stalled.

As the aircraft continues to climb or as the outdoor temperature continues to fall for any reason so that more and more heat is demanded within the forward cabin, both auxiliary heaters will remain off but the damper 18 of the right-hand after cooler will continue to close more and more until it is full closed. When it has become fully closed, the contact finger 52 will be at the extreme left-hand end of balancing resistance 114. Now, if the forward cabin still demands more heat and further unbalances the bridge, it will be evident that motor mechanism 38, having reached its opposite extreme position, can do nothing further towards rebalancing the bridge. As a result, the next time contact finger 45 is connected to bridge output terminal 140, its potential will be lower than that of bridge output terminal 44. Therefore, for the first time, the motor winding 117 will be energized with a current which leads that of motor winding 116 and rotor 115 will turn in the direction opposite to that which it had theretofore attempted to rotate. This drives contact finger 45 along balancing resistance 119 towards the left-hand end thereof and simultaneously closes off the damper 30 of the left-hand after cooler so that less of the cold outside air cools the hot compressed air. Such movement will continue until contact finger 45 is in such position on balancing resistance 119 as to again rebalance the bridge.

The modulating motor mechanism 58 however under such conditions will still remain stationary in the position shown since the balance point for the bridge is now within the range of balancing resistance 119.

As it continues to get colder and colder outside and as the forward cabin temperature therefore continues to drop, the forward cabin temperature thermostat will continue removing resistance from in series with the forward cabin discharge controller 150 so as to continue raising its control point so that hotter and hotter air is delivered to both the forward and aft cabins. When the heat loss becomes great enough, the contact finger 45 will move to the extreme left-hand end of balancing resistance 119 under which conditions the damper 30 will be completely closed so that both after coolers are completely shut off. The system is therefore using the entire heat output of the right and left-hand compressors. If this heat output is insufficient to maintain the temperature of the air being discharged into the forward cabin at that point for which such controller has been set by the action of the forward cabin thermostat, the resistance in the control leg of the bridge at the time that the modulating motor mechanism 58 for the forward cabin auxiliary heater is connected into the bridge circuit will become still smaller. The potential of bridge output terminal 140 under such conditions will rise above that of bridge output terminal 44 and motor winding 122, for the first time, will become energized with a current which leads that of motor winding 121. Contact finger 62 therefore moves to the left along balancing resistance 124 in order to rebalance the bridge circuit. Modulating valve 57 in the fuel supply for the forward cabin auxiliary heater 24 therefore begins opening. When the demand is great enough so that the valve 57 opens at least 15 per cent, the switch operating member 63 will operate snap switch 64 to its closed position to energize relay coil 65 in the manner heretofore described. Closure of switch arm 70 into engagement with contact 71 energizes the solenoid fuel supply valve 58 and places heater 24 into operation.

The auxiliary heater 24, as explained, is not and cannot safely be brought into operation except at a minimum of 15 per cent of its full capacity. Since this heater has quite a large capacity, 15 per cent of such capacity results in the delivery of considerable heat to the forward cabin; in fact, too much heat to prevent the temperature from overshooting. However, energization of relay coil 65, as heretofore explained, moves switch arm 72 away from contact 73 and into engagement with contact 74. As a result, certain new circuits are set up in the controlling leg of the bridge. Now, when the cam 185 closes its switches so as to connect the right-hand after cooler control motor 38 into the system, it is no longer controlled by the forward cabin discharge controller but is now controlled by the forward cabin heater intake controller 151 which responds to the temperature of the air being delivered to the heater as distinguished from responding to the temperature of the air being discharged by the heater. This control circuit is as follows: starting with the bridge input terminal 42, wire 265, wire 277, wire 278, wire 279, switch 200, wire 280, wire 281, switch arm 72, contact 74, wire 305, forward cabin heater intake controller 151, wire 306, wire 285, resistance 153, contact 154, arm 155, wire 286, wire 272, the left-hand portion of calibration resistance 139, contact 138, and bridge output terminal 44. The resistance of the forward cabin intake controller is so arranged that it demands a somewhat lower temperature than the forward cabin discharge controller 150. Therefore, when the forward cabin heater intake controller 151 is thus placed in control of the motor mechanism 38, which motor mechanism has formerly been in the position in which the right-hand after cooler damper 18 was fully closed, the balance of the bridge is changed so that the motor mechanism 38 backs up somewhat towards the position shown and thereby somewhat opens up the damper 18 of the right-hand after cooler. Some outside air is now used to cool the temperature of the compressed air whereby the temperature of the air delivered to the forward cabin auxiliary heater 24 is reduced to compensate for the initial relatively large output at which such heater must be started. Similarly, the motor mechanism 53 for the left-hand after cooler is now controlled by the forward cabin intake controller 151. This controlling circuit of the bridge is as follows: starting with bridge input terminal 42, wire 265, wire 277, wire 278, wire 300, switch 206, wire 301, wire 281, switch arm 72, contact 74, wire 305, controller 151, wire 306, wire 285, resistance 153, contact 154, arm 155, wire 286, wire 272, resistance 139, contact 138, and bridge output terminal 44.

As a result, the left-hand after cooler damper 30 may also begin to reopen. Of course, it should be noted that any resistance value which causes the motor mechanism 38 to move its contact finger 52 away from its left-hand end will, in view of what has been said heretofore, when applied to the motor mechanism 53 be such as to cause it to move its slider 45 to its complete right-hand position. Therefore, whether or not each of these motor mechanisms will be moved under the influence of forward cabin heater intake controller 151 and the extent to which motor mechanism 53 will be moved if motor mechanism 38 does not move at all, depends upon the resistance value of the controller 151. This in turn depends upon the amount of temperature difference or the difference in the temperature settings of the intake controller 151 and the discharge controller 152. This further depends in turn upon how much overshooting will take place upon the initiation of operation of forward cabin auxiliary heater 24 at 15% of its capacity since it is the intention, as has been accomplished in actual practice, to merely compensate for whatever overshooting may take place and this of course will vary with a number of factors including the minimum capacity allowable in initiating heater operation, the total capacity of the heater, the size of the cabin being heated, etc. However, in any event, the intake controller resistance 151 is so chosen that at least one of the after coolers will have its shutter open somewhat so as to compensate for the initial blast of heat delivered to the forward cabin upon bringing into operation the forward cabin auxiliary heater 24.

If the temperature continues to drop, the forward cabin thermostat will remove further resistance both from in series with the forward cabin discharge controller 150 and the forward cabin heater intake controller 151. The control points of each of these controllers will thereby be raised. Raising of the control point of the forward cabin discharge controller 150 will of course cause the heater modulating valve 57 to open wider and wider until full capacity of the heater is utilized, if this be necessary. Raising of the control point of the forward cabin heater intake controller 151 will result in reclosing off of one or the other of the after cooler dampers 18 and 30, depending upon whether both were opened initially or if only one of them was opened initially.

As to the aft cabin, so long as the heat of the compressed air as controlled by the dampers on the right and left-hand after coolers was sufficient to maintain desired conditions within the forward cabin, and due to the division of such heated air between the two cabins, the aft cabin would remain under reasonably accurate control until such time as the auxiliary heater for the forward cabin was brought on. This would indicate that there was insufficient heat for the aft cabin also. In order to obtain more heat for the aft cabin under such conditions, the pilot can operate the manual contact 269 along the resistance 268 so as to remove as much of such resistance as desired. This action raises the control point of the aft cabin controller 152. In other words, it reduces the total resistance in the controlling leg of the bridge circuit when the motor mechanism 84 is connected into the system with the result that higher and higher discharge temperatures must be maintained to the aft cabin in order to maintain the system in balance. In order to obtain such higher discharge temperatures and rebalance the bridge, the contact finger 89 must move along balancing resistance 109 towards its left-hand end. When it has moved 15 per cent of its total movement, the switch operating member 90 operates the snap switch 91 to energize relay coil 92 whereupon the solenoid fuel valve 83 is opened and the aft cabin auxiliary heater 35 is turned on. In this manner, the aft cabin temperature can be maintained by the pilot through his adjusting the manual resistance in association with the aft cabin controller 152. Of course, the aft cabin could be provided with an entirely separate control system of its own corresponding to the control system for the forward cabin.

It should also be understood that the control point of the aft cabin 152 could be automatically adjusted by an aft cabin thermostat similar to the forward cabin thermostat. On the other hand, if full automatic control is not desired, the forward cabin thermostat could be replaced by a manual controller such as used in connection with the aft cabin controller 152.

It is believed it will be obvious that the reverse action will take place upon temperature increase due to a rise in temperature in the outside air either by reason of atmospheric conditions or by reason of the aircraft going downwardly to a lower altitude.

The operation as described above correctly sets forth what would happen on a gradual lowering in temperature and assuming that the air compressors always were delivering some heat. However, since in actual practice it is not the intention to operate the air compressors so as to maintain a pressure within the cabin equivalent to standard atmospheric pressure at sea level, but instead only to maintain a pressure in the cabin equal to standard conditions, say at 8,000 feet, there will be no heat aavilable from the air compressors until an altiutde of 8,000 feet is reached.

Although the electrical sequence and operation of the parts would be unchanged, the following is an example as to what would actually happen under normal flight conditions wherein the air compressors were not actually used to any extent until substantially 8,000 feet altitude were reached. Assuming that the plane took off at or about sea level and in a temperate climate so that the outdoor air temperature were 80 degrees or above, the parts of the mechanism would all be in the position shown with both after cooler shutters wide open and both auxiliary heaters off. As the aircraft gains altitude and before it reaches an altitude of 8,000 feet so that the air compressors are still incapable of furnishing any heat, it is obvious that the outdoor temperature will fall below 80°. As a result, cold outside air will be supplied to the cabin, and in addition, the heat loss from the cabin to the outside atmosphere will cause the cabin temperature to drop. As brought out above, the first reation to this drop in temperature will be a sequential closing down of the right-hand and then the left-hand shutters of the right and left-hand after coolers. This will reduce the amount of cold outside air flowing through the right and left-hand after coolers but, since the air compressors are not furnishing any heated air anyway, there will be no actual result in the direction of raising the temperature of the cabin. When it becomes sufficiently cold outside and an altitude of 8,000 feet has not been reached, the temperature in the forward cabin will have fallen to such an extent that the auxiliary heater 24 will be brought on. Also, the temperature in the aft cabin may have fallen to such an extent that the pilot finds it necessary to adjust the manual controller or manual control resistance contact 269 so that the auxiliary heater 35 for the aft cabin will be brought into operation.

As the aircraft continues to climb and rises above 8,000 feet the right and left-hand compressors will be brought into operation so as to maintain the desired pressure within the cabin. The compression of this air will likewise furnish heat. A point will therefore be reached at some altitude wherein there is sufficient heat being furnished to the cabins by the right and left-hand compressors (through the after coolers whose shutters are completely closed) that the temperature in the cabins will rise higher than desired. The automatic control system for the forward cabin will therefore begin closing off the fuel valve for the auxiliary heater 24 for the forward cabin. By manual adjustment, the pilot can accomplish the same result in connection with the aft cabin auxiliary heater 35. As the aircraft continues to rise, more and more heat will be produced by the compressors in maintaining the desired pressures within the cabins so that the auxiliary heaters will be used less and less. A condition may ultimately occur in which the compressors will be furnishing so much heated air in maintaining desired pressure conditions within the cabin that the auxiliary heaters will be turned completely off. In fact, the shutters on the after coolers or at least one of them may begin to open somewhat in order to dissipate the excess heat produced by the compressors in maintaining the desired pressures within the cabins.

The reverse operation will take place as the plane begins to descend. As it descends, it is unnecessary to furnish so much compressed air to the cabins in order to maintain the desired pressures therein. As a result, less heat will be furnished to the cabins by the air compressors. The after cooler shutters will therefore go completely closed so as to utilize all of the available heat of compression. When this is insufficient, the auxiliary heaters will again be brought into operation. As the plane continues to descend the available heat of compression from the air compressors will be less and less until, at some altitude around 8,000 feet, it will become negligible or entirely gone. Under such conditions, the heat losses from the cabins must again be entirely supplied by the auxiliary heaters. As the plane continues to descend and if it is descending in a temperate climate where the temperature at ground level and some distance thereabove is 80° or higher, then finally the auxiliary heaters will be completely turned off and no heat will be necessary in either of the cabins.

In this manner, it will be noted that the auxiliary heaters are used only when necessary. In so far as is possible, the heat required by the cabins is supplied by the air compressors. However, whenever the air compressors do not furnish sufficient heat, then the auxiliary heaters are placed into operation.

From the foregoing, it will be seen that in connection with the forward cabin, I have disclosed a completely automatic control system wherein the temperature in such cabin is automatically maintained at a predetermined value or within a predetermined range of change by utilizing auxiliary heating means whenever necessary and by utilizing, to the fullest extent possible, whatever heat is available by reason of maintaining desired pressures within such cabin. Furthermore, I have disclosed automatic means for preventing overshooting when heat is available from the air compressors but in insufficient quantity so that an auxiliary heater must be placed into operation, but which auxiliary heater cannot be initially started except at some relatively high percentage of its total capacity. Specifically, this is accomplished by not utilizing the full amount of heat being generated by the air compressors. This is the only circumstance under which the heat of compression is not utilized to its fullest available capacity and in this instance some of that heat is sacrificed towards the end of maintaining desired temperature conditions within the cabin and preventing overshooting and too frequent "on-off" operation of the auxiliary heater.

In respect to the aft cabin, as stated above, it could be made fully automatic in the same manner as the forward cabin temperature control. Or, if desired, an entirely separate system entirely analogous to that for the forward cabin could be used for the aft cabin.

It should be further understood that my system of control includes features of novelty in respect to the modulation of two or more devices upon the demands of a single controller irrespective of the type of system in which the apparatus is used. Furthermore, I have provided a novel bridge system in which the rebalancing is accomplished by a number of modulating motors all of which remain in their proper step or sequence. Many of these features of my present invention are of general utility in the motor control art. I therefore intend to be limited only by the scope of the claims appended hereto.

I claim as my invention:

1. In a proportioning system, in combination, first and second power operated devices which require the application of power to operate the same in either of two directions, a single controller, and control means associated with said controller and said devices for positioning said first device proportionally to the demand by said controller throughout a range of movement and then initiating positioning of the second device proportionally to the controller demand upon a continuous change in demand by said controller.

2. In a proportioning system, in combination, first and second power operated devices which require the application of power to operate the same in either of two directions, a single controller, control means associated with said controller and said devices for positioning said first device proportionally to the demand by said controller throughout its range of movement and then positioning the second device proportionally to the controller demand upon a continuous change in demand by said controller, and a second controller for reversing the movement of said first device as an incident to initial operation of said second device by said first controller.

3. In a proportioning system, in combination, a follow-up system including a controller for operating the system in a manner to require a predetermined amount of follow-up action, a first device to be proportionally positioned, follow-up means operated thereby operative to provide only a portion of the follow-up action required by the system under the control of said controller, a second device to be proportionally positioned, and a second follow-up means operated thereby operative to provide a different portion of the follow-up action required by said system under the control of said controller.

4. In a positioning system, in combination, a bridge circuit, a controller associated with said bridge circuit for unbalancing said bridge circuit throughout a wide range, a first device to be positioned responsive to a predetermined portion of the range of unbalance in said bridge circuit whereby said first device is positioned only when said bridge is unbalanced within said predetermined portion, and a second device to be positioned responsive to a different portion of the range of unbalance in said bridge circuit to which said first device does not operatively respond.

5. In a balanced bridge circuit, in combination, a controller for unbalancing said bridge circuit throughout a predetermined range, means responsive to unbalance in the bridge circuit, means for rebalancing said bridge circuit, a first power means controlled by said unbalance responsive means for operating said rebalancing means in a manner to rebalance said bridge only for a portion of the range of unbalance produced by said controller, and a second power means controlled by said unbalance responsive means for operating said rebalancing means in a manner to rebalance said bridge for a different portion of the range of unbalance produced by said controller.

6. In a balanced bridge circuit, in combination, a controller capable of producing a relatively large range of unbalance in said bridge circuit, a pair of rebalancing devices each capable of rebalancing said bridge circuit throughout different portions of said range of unbalance but individually incapable of rebalancing said bridge circuit throughout the complete range of unbalance which said controller is capable of producing, and means responsive to unbalance in said bridge circuit for operating said devices.

7. In a balanced bridge circuit, in combination, a controller capable of producing a relatively large range of unbalance in said bridge circuit, a pair of rebalancing devices each capable of rebalancing said bridge circuit throughout different portions of said range of unbalance but individually incapable of rebalancing said bridge circuit throughout the complete range of unbalance which said controller is capable of producing, means responsive to unbalance in said bridge circuit, and means for selectively connecting said last-named means to said rebalancing devices.

8. In a balanced bridge circuit, in combination, means for unbalancing said bridge circuit, a pair of rebalancing means for said bridge circuit, a single means responsive to unbalance in said bridge circuit, and means for selectively connecting said rebalancing means to said unbalance responsive means.

9. In a control system of the resistance bridge type, in combination, a bridge circuit including a variable resistance means for producing unbalance therein and two or more rebalancing resistance means, the proportions of the variable resistance means and said rebalancing resistance means being such that no one of the rebalancing means individually is capable of rebalancing said bridge upon a large range of unbalance produced by said variable resistance means but are such that all of said rebalancing resistance means in cooperation are capable of rebalancing said bridge upon such a large range of unbalance, and means including apparatus responsive to unbalance in said bridge for operating all of said rebalancing resistance means in a manner to rebalance said bridge.

10. In a control system of the resistance bridge type, in combination, a bridge circuit including a variable resistance means for producing unbalance therein and two or more rebalancing resistance means the resistors of which are connected in series, means responsive to unbalance in said bridge, and means to selectively connect said rebalancing resistance means to said unbalance responsive means.

11. In a control system of the resistance bridge type, in combination, a bridge circuit including a variable resistance means for producing unbalance therein and two or more electrically operated rebalancing resistance means the resistors of which are connected in series, means responsive to unbalance in said bridge, and a sequence switching means for sequentially rendering each of said rebalancing resistance means operative and connecting the same to said unbalance responsive means so that each said rebalancing means is sequentially given an opportunity to attempt to rebalance said bridge circuit if it is out of balance at such time.

12. In a normally balanced system of the follow up type, a main controller, a plurality of follow up controllers connected together and all of which jointly have a follow up range corresponding to the range of said controller, a plurality of devices to be positioned, each of which is operative to operate a different one of said follow up controllers, and means associated with said devices and responsive to the unbalance between said main controller and said plurality of follow up controllers for positioning any one of said devices as long as said system can be balanced by operation of the follow up controller associated with that device, and means to prevent said last named means from causing positioning of any one device while the system is unbalanced until the preceding follow up controller has been operated to the extreme limit of its follow up range.

HUBERT T. SPARROW.